Dec. 6, 1949 T. E. HORST 2,490,131
ARTICLE HANDLING AND WEIGHING APPARATUS
Filed May 15, 1947 2 Sheets-Sheet 2

INVENTOR.
Tallmon E. Horst.
BY
Thiess, Olson & Mecklenburger
Attys.

Patented Dec. 6, 1949

2,490,131

UNITED STATES PATENT OFFICE 2,490,131

ARTICLE HANDLING AND WEIGHING APPARATUS

Tallmon E. Horst, Chicago, Ill., assignor to United Air Lines, Inc., Chicago, Ill., a corporation of Delaware Application May 15, 1947, Serial No. 748,262

11 Claims. (Cl. 265—73)

This invention relates to article handling and weighing apparatus, more particularly to pedal-operated mechanism for facilitating the removal of articles from a scale or weighing apparatus after completion of the weighing operation, and the invention has for an object the provision of simple and inexpensive apparatus of this character.

Although the invention is not limited thereto, it is particularly applicable to and will be described in connection with the weighing and handling of baggage in commercial airline ticket offices wherein each piece of passengers' baggage must be weighed and ticketed at the time the passengers check in for departure. In the past, airline ticket offices have been provided with conventional platform scales located either at the end of a ticket counter or at interrupted portions of the counter, thereby limiting the amount of counter space available for use by the personnel engaged in selling tickets, checking in departing passengers, and ticketing baggage. It has been proposed to provide counters having a continuous top or working surface, and to provide openings in the front and rear surfaces of the counter to permit access to a scale positioned beneath the counter top, thereby to increase the available working surface. In such installations the baggage is inserted through the front of the counter onto the scale by a porter or a passenger, and after the weighing operation it is necessary for the attendant to stoop down and reach into the space beneath the counter in order to remove the baggage rearwardly for ticketing. In addition to the inconvenience involved, this is a time-consuming operation, and it is a further object of this invention to provide an apparatus whereby baggage inserted from the front of a ticket counter may be weighed and readily removed rearwardly without requiring laborious and time-consuming manipulations by the attendant.

In carrying out the present invention in one form, a scale or weighing mechanism is provided with a scale platform having alternate grooves and lands extending longitudinally thereof. A transversely extending pivot is located adjacent one end of the platform, and a discharge member mounted on the pivot for movement between a horizontal position and inclined positions is provided, having spaced elements adapted to extend along said grooves between said lands when in the horizontal position, so that the platform may undergo normal weighing movements when articles are deposited on the lands of the platform, the discharge member when tilted about said pivot providing an inclined discharge chute whereby articles after weighing are lifted from the lands of the platform and caused to slide down the inclined chute to a rearward position readily available to the operator. Preferably a pair of discharge members are provided, and pedal means are arranged to operate one or both of the discharge members, as desired, selectively to discharge weighed articles from the scale platform.

For a more complete understanding of the invention, reference should now be had to the drawings, in which.

Figure 1:
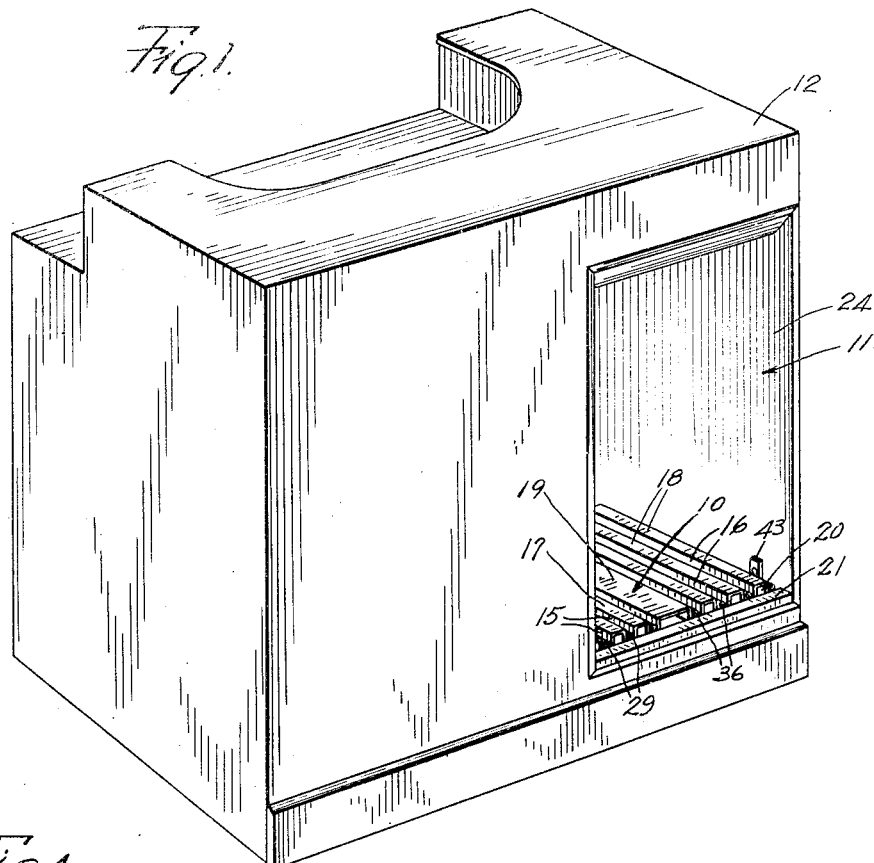
Fig. 1 is a somewhat diagrammatic perspective view of a section of a ticket counter employing a baggage weighing and handling apparatus embodying this invention.

Referring now to the drawings, the invention is shown as embodied in a baggage handling and weighing apparatus which includes a scale platform 10 mounted within an opening 11 in a ticket counter 12, shown somewhat diagrammatically in Fig. 1. The scale platform 10 is mounted on and forms part of a conventional scale or weighing mechanism, indicated by broken lines in Fig. 4, and identified by the reference numeral 14. It will of course be understood that the scale 14 is provided with the usual dial indicator (not shown), which may be located in any convenient place within the range of vision of the operator.

Figure 2:
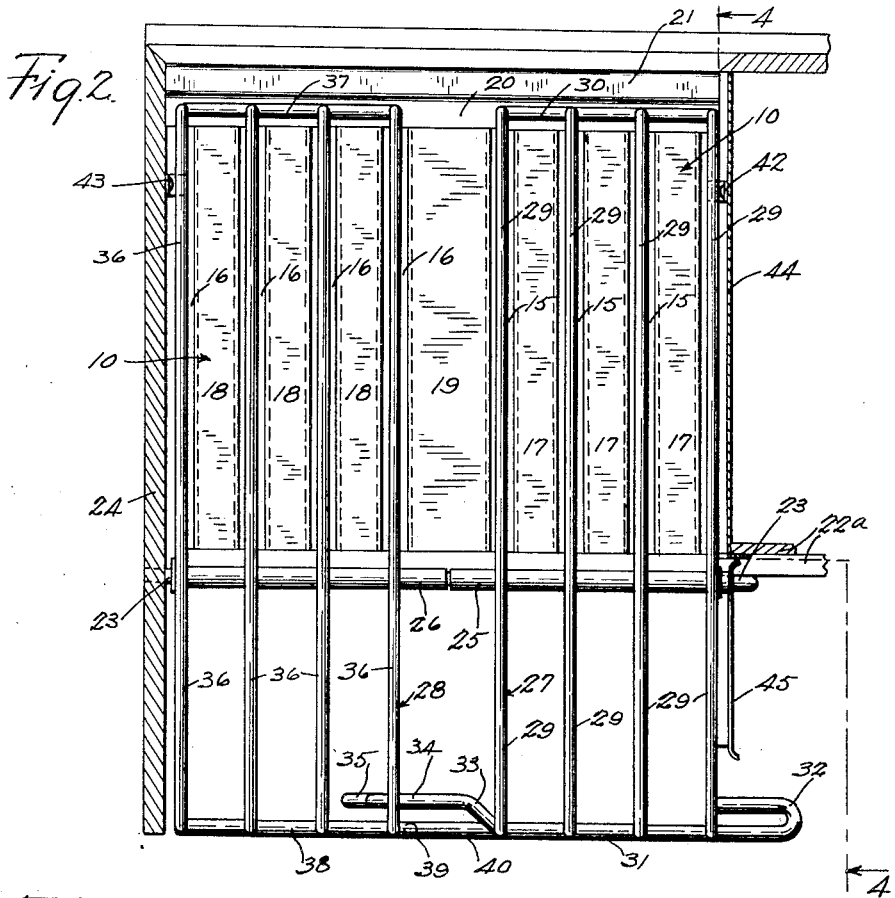
Fig. 2 is a plan view of the apparatus shown in Fig. 1, portions of the ticket counter being shown in section.
Figure 3:
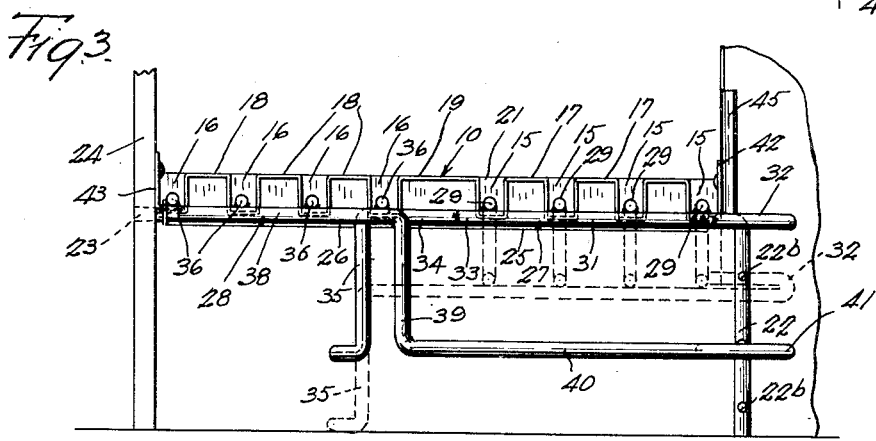
Fig. 3 is an end elevational view taken from the operator's side of the ticket counter.

As shown best in Figs. 2 and 3, the scale platform 10 is corrugated longitudinally to provide two sets of longitudinally extending grooves 15 and 16, separated by lands 17 and 18 on which articles to be weighed may be supported, a somewhat wider land 19 separating the two sets of longitudinal grooves from each other. Adjacent one end of the scale platform 10 is a transverse groove 20 which intersects the various longitudinal grooves 15 and 16, the adjacent end of the scale platform terminating in a transverse land 21.

Disposed adjacent the end of the scale platform opposite from the transverse groove 20 is a transversely extending pivot which comprises a vertical leg 22 secured to a suitable support 22a by screws 22b or the like (Fig. 4), and a horizontally extending leg 23 which extends the entire width of the scale platform and is secured at its left-hand end as viewed in Figs. 2 and 3 in the side panel 24 of the ticket counter. Supported on the horizontal leg 23 of the pivot is a pair of bearing members 25 and 26 disposed in end-to-end relation for tiltably supporting on the pivot a pair of discharge members or grilles, indicated generally by the reference numerals 27 and 28.

The discharge member or grille 27 comprises a plurality of longitudinally extending rods 29 which are welded intermediate their ends to the bearing 25, and which are connected together at one end by a cross rod 30 welded or otherwise suitably secured thereto. The opposite ends of the rods 29 are connected, as shown, to a crossbar 31, which terminates at one end in an outwardly extending pedal 32, and which terminates at the opposite end in an angularly disposed portion 33 (Fig. 2) from which extends an end portion 34 substantially parallel to the cross member 31, the portion 34 terminating in a downwardly extending foot or stop 35, as shown best in Fig. 3.

The tiltable discharge member or grille 28 is in general similar to the discharge member 27, and comprises a plurality of spaced, longitudinally extending rods 36 welded intermediate their ends to the bearing 26, and connected, as shown, at one end to a transverse rod 37 suitably welded or otherwise secured thereto. Adjacent their opposite ends the rods 36 are welded to a crossbar 38 which is provided with a downwardly extending portion 39 and a horizontally extending portion 40 which terminates in a suitable pedal 41 disposed directly below the pedal 32.

As will be apparent from Figs. 2 and 3, the horizontally extending pivot leg 23 is disposed at substantially the same level as the scale platform 10, so that the rods 29 and 36 of the discharge members 27 and 28 lie within the grooves 15 and 16 when the discharge members are in a horizontal position, the end bars 30 and 37 being disposed in the transverse groove 20. Discharge members 27 and 28 are so balanced with respect to the pivot as to tend to move in a clockwise direction about the pivot, as viewed in Fig. 4, and are normally retained in their respective horizontal positions by suitable clips 42 and 43 which are respectively mounted on the side panels 44 and 24 of the opening 11 through the ticket counter so as to be engaged by the outermost ones of the rods 29 and 36.

Thus the discharge members 27 and 28 are normally disposed with the rods 29 and 36 extending along the grooves 15 and 16 but out of engagement with the scale platform 10 and below the level of the lands 17, 18, 19, and 21, so that the scale platform is free to move during normal weighing operations without interference from the discharge members. When articles of luggage are placed on the scale platform, the weighing mechanism functions in its usual manner and the operator may record the weights in accordance with the usual practice. After the weighing operation has been completed, removal of the articles of luggage may be quickly and easily accomplished merely by operating one or the other of the pedals 32 and 41.

Figure 4:
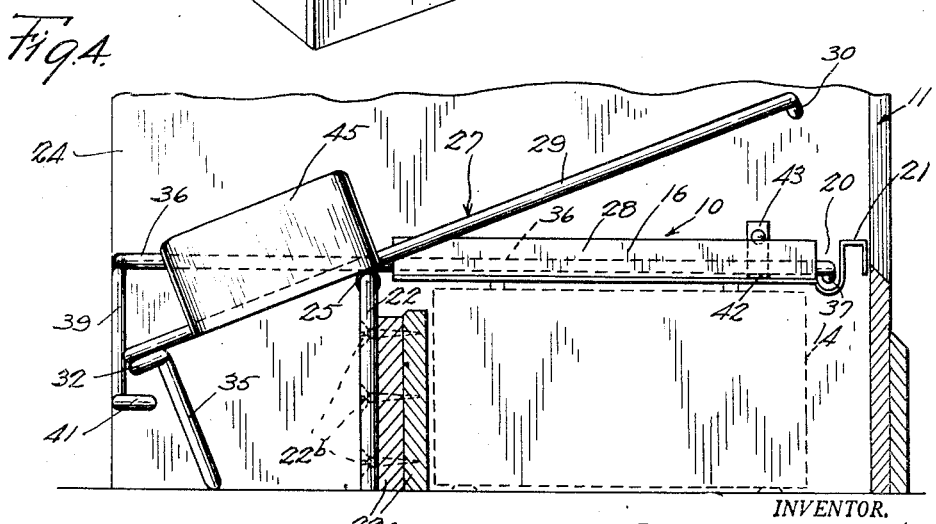
Fig. 4 is a side elevational view, partly in section, along the line 4—4 of Fig. 2.

Assuming that two articles of luggage have been placed on the platform, one directly over each of the discharge members 27 and 28, and that the operator desires only the total weight of the two articles, he may, after the weights have been recorded, accomplish simultaneous removal of both pieces of luggage merely by depressing the pedal 41, which causes both of the discharge members 27 and 28 to tilt to an inclined position corresponding to the inclined position of the member 27 shown in Fig. 4, thereby providing inclined discharge chutes down which the luggage will slide to a rearward position readily available to the operator. Tilting operation of both of the discharge members by the pedal 41 is accomplished due to the fact that this pedal 41 is directly connected to the discharge member 28 so as to effect tilting thereof, and to the fact that the extending portion 34 of the discharge member 27 underlies the right-hand one of the rods 36 on the discharge member 28 whereby tilting movement of the discharge member 28 is always accompanied by the simultaneous movement of the discharge member 27. In the event that the operator desires to remove only one piece of luggage so as to obtain the individual weights of the two pieces, the operator may depress the pedal 32, which will effect tilting movement of the discharge member 27 independently of the discharge member 28. The portion 34 and the foot 35 on the discharge member 27, since they underlie the discharge member 28, merely move downwardly away from the discharge member 28 to the broken-line position shown in Fig. 3 without effecting tilting movement of the member 28. As will be apparent from Figs. 3 and 4, the foot 35 serves as a stop for engaging the floor to limit the tilting movement of both of the discharge members when simultaneously tilted by the pedal 41, and to similarly limit the tilting of the discharge member 27 when operated alone by the pedal 32. If desired, the rearward portion of the discharge member 27 may be provided at one side with a suitable guide plate 45 which is secured to the right-hand one of the bars 29 in order to insure that luggage sliding down the discharge member 27 will move in the desired rearward path.

It will now be apparent that apparatus embodying the present invention provides a simple and reliable baggage handling and weighing means wherein baggage deposited on the scale platform from the front of a ticket counter may be readily weighed and removed rearwardly without requiring any laborious and time-consuming stooping and reaching on the part of the attendant. The attendant having observed the weight of the baggage, may effect removal of the baggage from the scale merely by pressing the desired pedal, and this may be accomplished during the interval that the attendant is filling out the baggage tickets, so that the baggage may be weighed and transferred to a convenient position for ticketing with a minimum amount of effort on the part of the operator and in a minimum time interval.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. In combination, a scale platform, a discharge member including spaced elements adapted to extend into juxtaposition to said platform but free of engagement therewith to permit normal weighing movements of said platform independently of said member when the latter is in a substantially horizontal position, and means mounting said discharge member for tilting movement between said substantially horizontal position and inclined positions, said elements when said member is tilted forming an inclined discharge chute above said platform.

2. In combination, a scale platform having a plurality of grooves therein, a discharge member including spaced elements adapted to extend along said grooves when said member is in a substantially horizontal position to permit normal weighing movements of said platform, and means disposed adjacent one end of said scale platform mounting said discharge member for tilting movement between said substantially horizontal position and inclined positions, said elements when said member is tilted forming an inclined discharge chute above said platform.

3. In combination, a scale platform having a plurality of alternate grooves and lands therein, a pivot disposed adjacent one edge of said scale platform in spaced relation thereto and extending substantially parallel to said edge, and a discharge member mounted on said pivot for tilting movement between a substantially horizontal position and inclined positions, said discharge member including spaced elements adapted to extend along said grooves when said member is in said horizontal position to permit normal weighing movements of said platform, said elements when said member is tilted forming an inclined discharge chute above said lands.

4. In combination, a scale platform having a plurality of alternate grooves and lands therein, a pivot disposed adjacent one edge of said scale platform in spaced relation thereto and extending substantially parallel to said edge, and a discharge member mounted intermediate its ends on said pivot for tilting movement between a substantially horizontal position and inclined positions, the portion of said member on the platform side of said pivot comprising spaced elements adapted to extend along said grooves at a level below said lands to permit normal weighing movements of said platform when said member is in said horizontal position, the portion of said member on the side of said pivot away from said platform being depressible to tilt said member on said pivot whereupon said elements form an inclined discharge chute above said lands.

5. In combination, a scale platform having a plurality of alternate grooves and lands therein, a pivot disposed adjacent one edge of said scale platform in spaced relation thereto and extending substantially parallel to said edge, a discharge member mounted on said pivot for tilting movement between a substantially horizontal position and inclined positions, said discharge member including spaced elements adapted to extend along said grooves when said member is in said horizontal position to permit normal weighing movements of said platform, and actuating means for tilting said member about said pivot to move said elements out of said grooves and form an inclined discharge chute above said lands.

6. In combination, a scale platform having a plurality of alternate grooves and lands therein, a pivot disposed adjacent one edge of said scale platform in spaced relation thereto and extending substantially parallel to said edge, a discharge member mounted on said pivot for tilting movement between a substantially horizontal position and inclined positions, said discharge member including spaced elements adapted to extend along said grooves when said member is in said horizontal position, and abutment means engageable by said discharge member for supporting said member in said horizontal position with said elements in said grooves below said lands to permit normal weighing movements of said platform, said elements when said member is tilted forming an inclined discharge chute above said lands.

7. In combination, a scale platform having a plurality of alternate grooves and lands therein, a pivot disposed adjacent one edge of said scale platform in spaced relation thereto and extending substantially parallel to said edge, a discharge member mounted on said pivot for tilting movement between a substantially horizontal position and inclined positions, said discharge member including spaced elements adapted to extend along said grooves when said member is in said horizontal position, abutment means engageable by said discharge member for supporting said member in said horizontal position with said elements in said grooves below said lands to permit normal weighing movements of said platform, and actuating means for tilting said member about said pivot to move said elements out of said grooves and form an inclined discharge chute above said lands.

8. In combination, a scale platform having a plurality of alternate grooves and lands therein, a pivot disposed adjacent one edge of said scale platform in spaced relation thereto and extending substantially parallel to said edge, a pair of discharge members mounted in side-by-side relation on said pivot for tilting movement between substantially horizontal positions and inclined positions, each of said discharge members including spaced elements adapted to extend along said grooves when in said horizontal positions to permit normal weighing movements of said platform, actuating means for tilting one of said members about said pivot to move said elements of said one member out of said grooves and form an inclined discharge chute above a portion of said platform, and other actuating means for simultaneously tilting both of said members to form an inclined discharge chute above the entire platform.

9. In combination, a scale platform having a plurality of alternate grooves and lands therein, a pivot disposed adjacent one edge of said scale platform in spaced relation thereto and extending substantially parallel to said edge, a pair of discharge members mounted in side-by-side relation on said pivot for tilting movement between substantially horizontal positions and inclined positions, each of said discharge members including spaced elements adapted to extend along said grooves when in said horizontal positions, a pair of abutments respectively positioned for engagement by said discharge members for supporting said members in said horizontal positions during normal weighing movements of said platform, actuating means for tilting one of said members about said pivot to move said elements of said one member out of said grooves and form an inclined discharge chute above a portion of said platform, and other actuating means for simultaneously tilting both of said members to form an inclined discharge chute above the entire platform.

10. In combination, a scale platform having a plurality of alternate grooves and lands therein and a groove extending transversely with respect to said first-mentioned grooves and intersecting the same, a pivot disposed adjacent one edge of said scale platform in spaced relation thereto and extending substantially parallel to said edge, a discharge grille mounted on said pivot for tilting movement between a substantially horizontal position and inclined positions, said discharge grille comprising a plurality of spaced rods adapted to extend along said first mentioned grooves when in said horizontal position and a rod connecting said spaced rods and extending transversely with respect thereto and adapted to be received in said transversely extending groove, said discharge grille when in said horizontal position permitting normal weighing movements of said platform, and means for tilting said grille to form an inclined discharge chute above said platform.

11. In combination, a scale platform having a plurality of alternate grooves and lands therein and a groove extending transversely with respect to said first-mentioned grooves and intersecting the same, a pivot disposed adjacent one edge of said scale platform in spaced relation thereto and extending substantially parallel to said edge, a pair of discharge grilles mounted in side-by-side relation on said pivot for tilting movement between horizontal positions and inclined positions, each of said discharge grilles comprising a plurality of spaced rods adapted to extend along said first-mentioned grooves when said grilles occupy said horizontal positions and a rod connecting said spaced rods and extending transversely with respect thereto and adapted to be received in said transversely extending groove, said discharge grilles in said horizontal positions permitting normal weighing movements of said platform, actuating means for tilting one of said grilles to move the rods thereof out of said grooves and form an inclined discharge chute over a portion of said platform, and other actuating means for simultaneously tilting both of said grilles to form an inclined discharge chute extending over the entire platform.

TALLMON E. HORST.

REFERENCES CITED

The following references are of record in the file of this patent:

UNITED STATES PATENTS

| Number | Name | Date |
|---|---|---|
| 329,100 | Tillmeyer et al. | Oct. 27, 1885 |
| 1,115,629 | Ward | Nov. 3, 1914 |
| 1,876,510 | Morrison | Sept. 6, 1932 |
| 2,360,661 | Eddy et al. | Oct. 17, 1944 |